No. 790,775. PATENTED MAY 23, 1905.
F. ZUCKER.
THRESHING MACHINE.
APPLICATION FILED OCT. 29, 1904.

2 SHEETS—SHEET 1.

Witnesses: Inventor:
Fred Osler. Friedrich Zucker.
Paul Jasick. by [signature]
Attorney.

No. 790,775. PATENTED MAY 23, 1905.
F. ZUCKER.
THRESHING MACHINE.
APPLICATION FILED OCT. 29, 1904.

2 SHEETS—SHEET 2.

Witnesses:
Fred Isler
Paul Garick

Inventor:
Friedrich Zucker
by
Attorney.

No. 790,775. Patented May 23, 1905.

UNITED STATES PATENT OFFICE.

FRIEDRICH ZUCKER, OF HOBERSDORF, AUSTRIA-HUNGARY.

THRESHING-MACHINE.

SPECIFICATION forming part of Letters Patent No. 790,775, dated May 23, 1905.

Application filed October 29, 1904. Serial No. 230,527.

*To all whom it may concern:*

Be it known that I, FRIEDRICH ZUCKER, a subject of the Emperor of Austria-Hungary, and a resident of Hobersdorf, Austria-Hungary, have invented new and useful Improvements in Threshing-Machines, of which the following is a specification.

The present invention relates to threshing-machines, straw-shaking machines, and the like.

The object of the invention is to remove the dust adhering to the straw, grains, and the like and to draw off at the same time the dusty air produced by the operation of the machine.

The invention consists in the arrangement of movable hoods at both ends of the machine which are closed all round with the exception of a slot at the end where the grain or straw is fed, all hoods being connected to a common fan. The air entering through the slot passes through the straw or the like and is passed on by a fan. To regulate the draft, throttle-valves are arranged in the channels leading to the fan, and slots are cut into the walls of the hoods, which are partly or wholly covered, according to the nature of the grain or straw to be treated.

The peculiar feature of the invention consists in the arrangement of the hoods for collecting the dust which rest on or close upon the goods and automatically adjust themselves.

Figure 1:
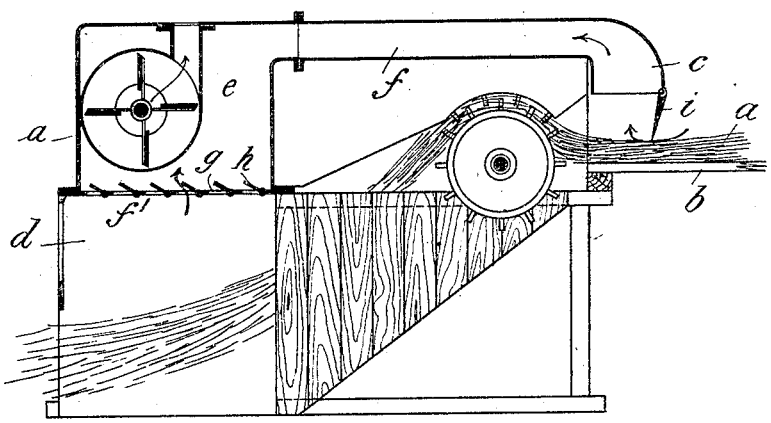
Figures 2, 3, 4:
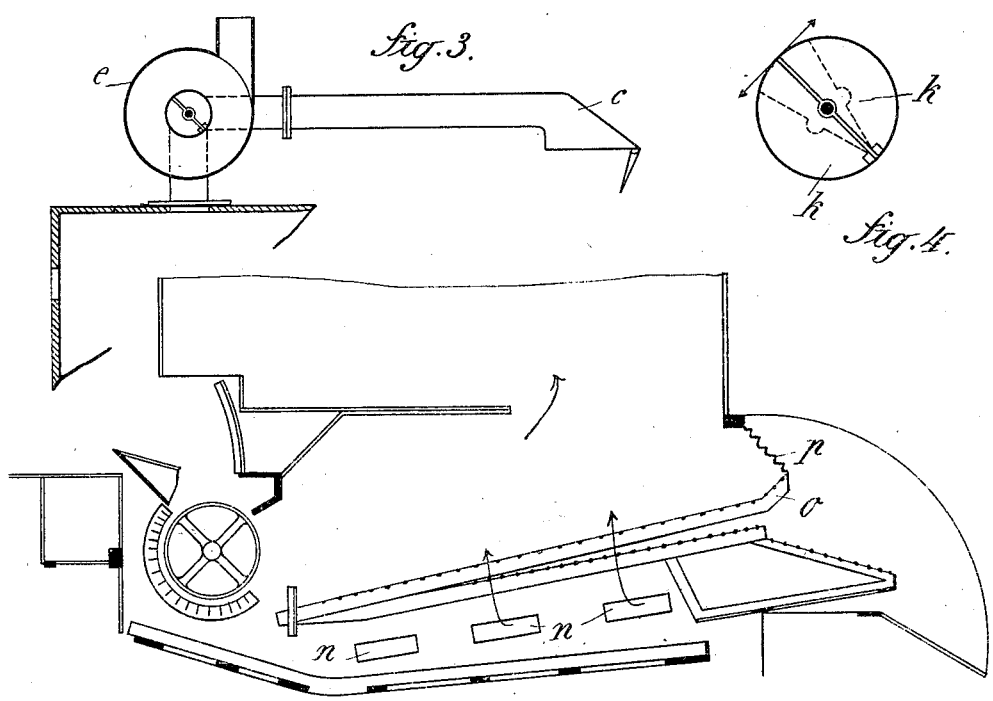
Figure 5:
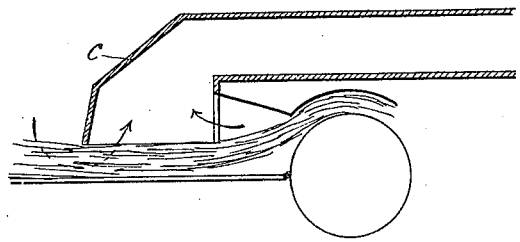

In the accompanying drawings the invention is shown in Figure 1 applied to a threshing-machine, and in Fig. 2 applied to a straw-shaking machine. Fig. 3 shows a modified construction of the arrangement of the dust-aspirator. Fig. 4 shows the draft-regulation damper. Figs. 5 to 9 represent different forms of movable hoods.

The material to be threshed, $a$, is placed on the table $b$ and fed below the hood $c$. After the straw has passed the cylinder it falls beneath a second hood $d$ and then leaves the threshing-machine.

Hood $c$ is connected to a fan $e$ through a channel $f$, and hood $d$ is in communication with the same by a wall $f'$, provided with holes or slots $g$. Each of these slots $g$ can be closed by an adjustable cover $h$, so that the draft can be regulated according to the nature of the material. The hood $c$ is provided with a flap $i$, hinged on one side to the hood $d$, while its free end rests on the material $a$.

The air is forced to pass through the material and draws off the dust adhering to the same. The dust stirred up during the operation of the machine is aspirated into the fan $e$ through the slots $g$.

With the same threshing-machine as shown in Fig. 1 the arrangement as shown in Figs. 3 and 4 can be used. In this case the wall $f$ is solid, and the draft is regulated by a damper $k$, partly covering the inlet $l$ of the fan $e$. Hood $d$ is provided with auxiliary air-inlets $m$, which serve as additional means for regulating the draft.

Fig. 2 shows the invention applied to a shaker. The air enters through holes $n$ below the shaking frame and passes through the straw. The influx of air at the end $o$ of the shaking frames is prevented by a collapsible hood $p$, which participates in the movements of the frame.

Figure 6:
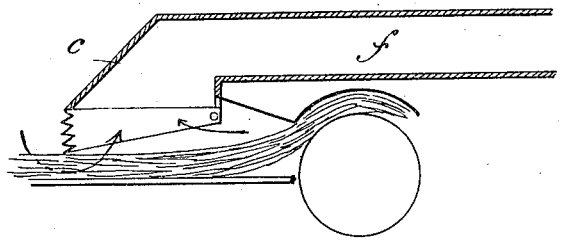
Figure 7:
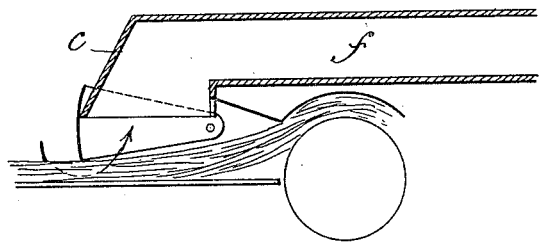
Figure 8:
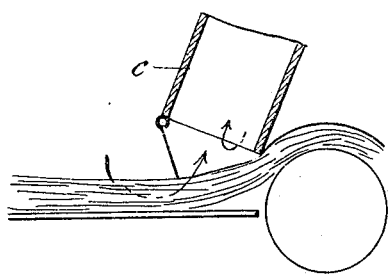
Figure 9:
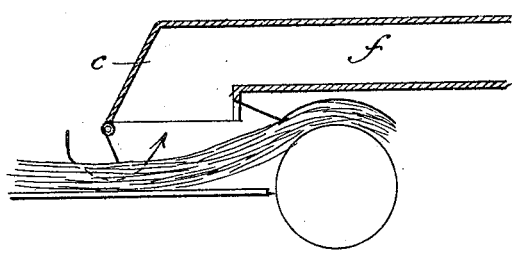

According to the kind of machinery to which my invention is applied, one of the hoods shown in Figs. 5 to 9 is used. The hood shown in Fig. 6 is of pliable material, so that the hood itself is collapsible and can easily adjust itself to any quantity of material. The hood shown in Fig. 7 is hinged to the frame of the machine, and in Figs. 8 and 9 a flap is pivoted to the hood, which flap, turning around its pivots, always lies close upon the straw.

Having fully described my invention, what I claim, and desire to secure by Letters Patent, is—

In combination, a threshing-machine casing, a feed-table therefor, a suction-fan, a casing inclosing the fan, valves in the bottom of the casing making openings in the top of the machine-casing, a conduit leading from the fan-casing to and directly over the feed-table, a hinged member depending from the mouth of the conduit adapted to be raised by the material fed to the machine, and means to regulate the quantity of air handled by the fan.

In testimony whereof I have hereunto set my hand in presence of two subscribing witnesses.

FRIEDRICH ZUCKER.

Witnesses:
   ALVESTO S. HOGUE,
   AUGUST FUGGER.